May 21, 1946. R. CHILTON 2,400,537
TRANSMISSION
Filed March 22, 1943 6 Sheets-Sheet 1

Fig. 1

INVENTOR
Roland Chilton.
BY
ATTORNEY

May 21, 1946.  R. CHILTON  2,400,537
TRANSMISSION
Filed March 22, 1943  6 Sheets-Sheet 5

INVENTOR
Roland Chilton.
BY
ATTORNEY

May 21, 1946. R. CHILTON 2,400,537

TRANSMISSION

Filed March 22, 1943 6 Sheets-Sheet 6

INVENTOR
Roland Chilton.
BY
ATTORNEY

Patented May 21, 1946

2,400,537

UNITED STATES PATENT OFFICE 2,400,537

TRANSMISSION

Roland Chilton, Ridgewood, N. J., assignor to Wright Aeronautical Corporation, a corporation of New York Application March 22, 1943, Serial No. 480,117

14 Claims. (Cl. 74—189.5)

This invention relates to transmissions affording a plurality of speed and torque ratios between driving and driven shafts and in certain respects has the same objectives and advantages as set forth in my co-pending application, Serial No. 462,059, which illustrates a four-speed gear as for a supercharger drive.

An additional object of the invention is to provide a progressively loadable variable slip coupling device in which only a fraction of the drive torque is transmitted by the slip coupling itself, thereby considerably reducing the size of the coupling required. A further object is to utilize such a coupling device in parallel with the variable speed gearset between a driving and a driven member whereby the coupling drive may be progressively loaded to relieve the gearset of driving torque to permit shifting of the gears, as disclosed in my above mentioned co-pending application.

The structure illustrated in the attached drawings is for a two-speed aircraft engine propeller reduction gear and this particular embodiment shows coaxial reversely rotating propeller shafts. However, as will appear from the description, this invention is not so limited but is of general application.

Specific objects and advantages of the invention will be obvious from or will be pointed out in the following description with reference to the drawings, in which.

Figure 1:
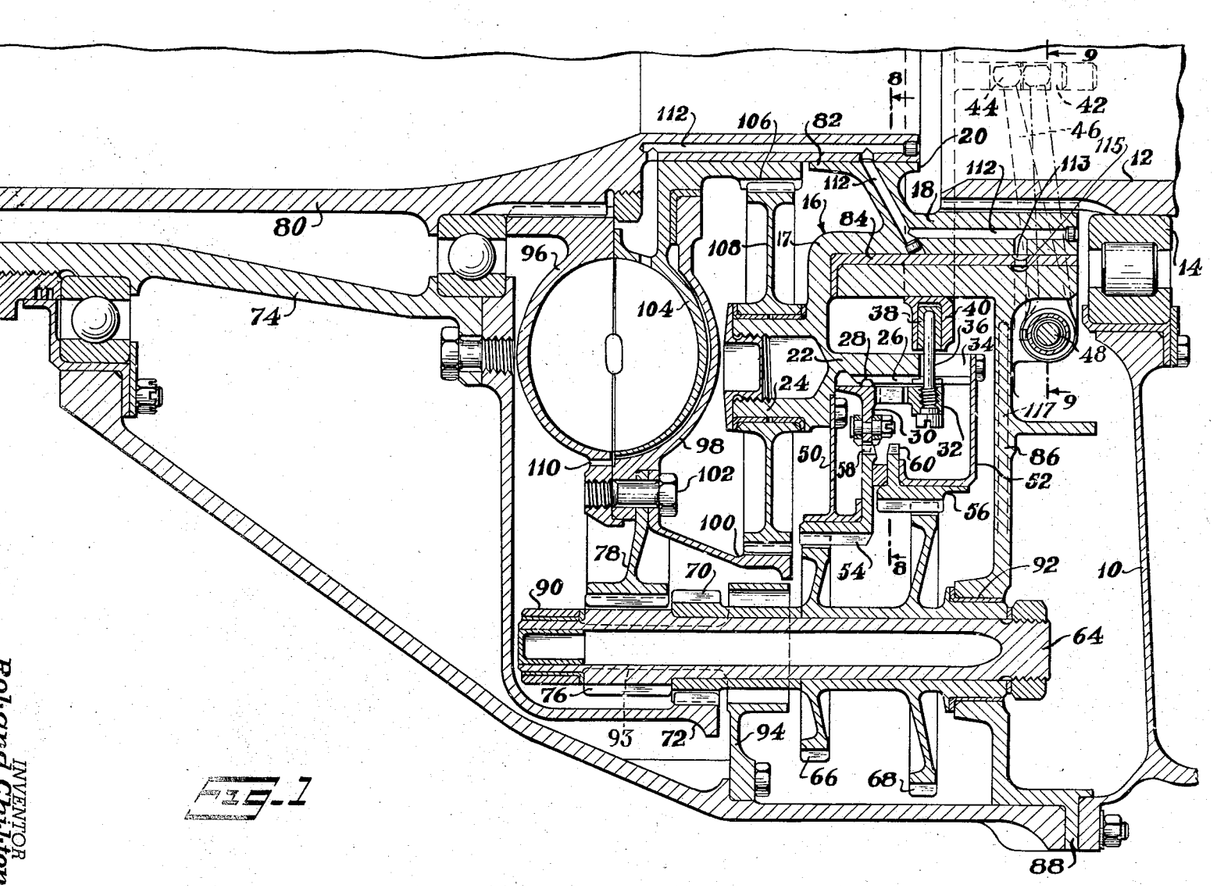
Fig. 1 is an axial section through the lower half of the device.
Figure 2:
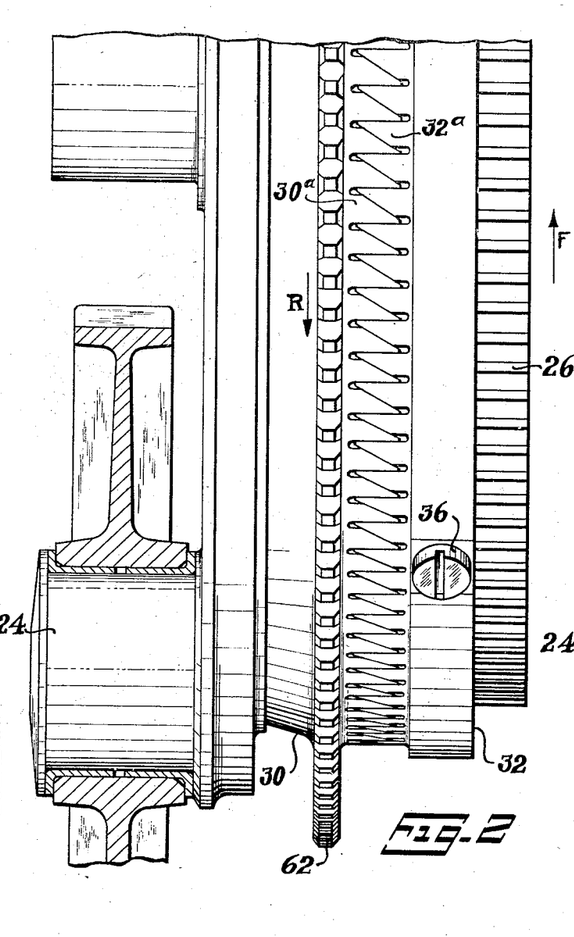
Fig. 2 is an outside view of the locking and shifting elements in locked position with an associated gear in section.
Figure 4:
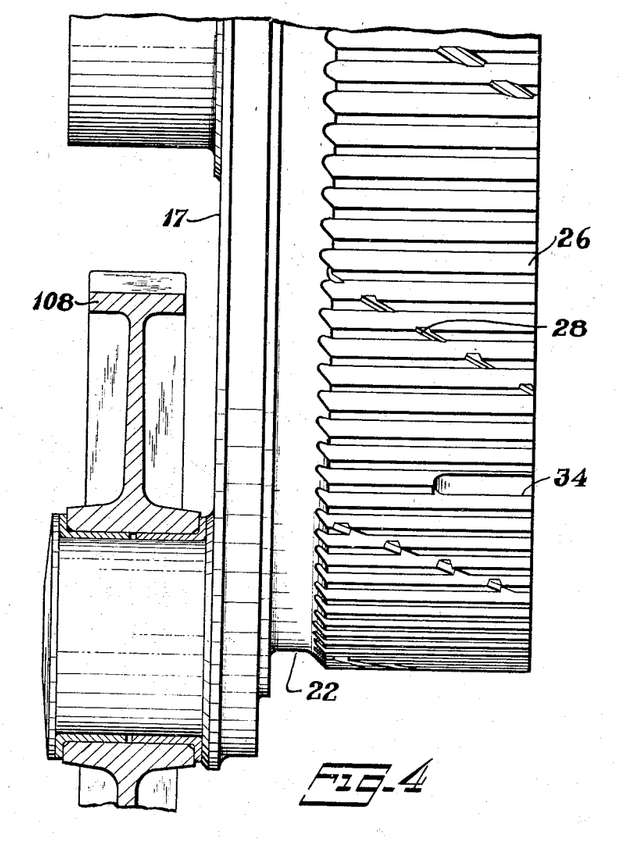
Fig. 4 is an outside view of a driving drum illustrating the helical and parallel splines with an associated gear in section.
Figure 5:
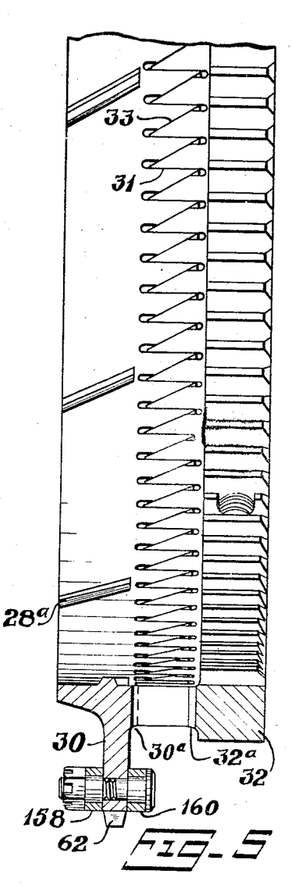
Fig. 5 is a sectional view showing the shift and locking members which engage the helical and parallel splines respectively.

Referring first to Fig. 1, 10 designates a crankcase of an engine from which protrudes the splined end of a crankshaft 12 supported in a conventional bearing 14. A driving member indicated generally at 16 comprises a hub 18 splined to the crankshaft as shown, a bearing member 20, a back plate 17, a drum 22, and a plurality of planet journals 24, all formed integral. The drum 22 has axial driving splines 26 better seen in Fig. 4 where it will also be seen that helical grooves 28 are cut through the top of the splines 26. Slidable on the helical grooves 28 is a shift or meshing member 30, seen in section in Fig. 5, with internal helical splines 28a which engage the grooves 28 (the "hand" of the helices of Figs. 4 and 5 appear opposite only because one is an outside view and the other a section). Mounted on the axial splines 26 is a locking member 32, best seen in Fig. 5. The shift member 30 and the locking member 32 have driving jaws 30a and 32a respectively. These jaws 30a and 32a are provided with axial driving faces 30b and 32b and with sloping backs 30c and 32c respectively. The sloping backs 30c and 32c are formed to the same helical angle as the splines 28 and 28a. These parts are shown in outside view with the locking jaws engaged in Fig. 2 and disengaged in Fig. 3. The drum 22 has slots 34 through which protrude pins 36 screwed rigidly into the locking member 32 and carrying shift-pads 38 engaged in a U-section shift collar 40. This shift collar 40 is provided with a pair of axially extending rods 42, also seen in the end view of Fig. 9. These rods have slots engaged by cylindrical heads 44 of a forked control lever 46 actuated from a shaft 48 through coupling control mechanism later to be described.

Mounted on the driving member drum 22 are centering discs 50 and 52 on which are mounted for free rotation a high speed driving gear 54 and a low speed driving gear 56. Each of these driving gears 54 and 56 has a web as shown furnished with clutch teeth 58 and 60, respectively, which may be engaged by companion clutch teeth 62 formed on the shift member 30. Around the high and low speed driving gears 54 and 56 are a plurality of layshafts 64 having high speed pinions 66 engaged with the high speed gear 54 and low speed pinions 68 engaged with the low speed gear 56. The layshafts 64 further include pinions 70 engaging a bell gear 72 rigid with an outer propeller shaft 74 and also pinions 76 engaged with a spur gear 78 rigid with an inner propeller shaft 80 which is extended to provide a journal 82 supported in the bearing 20 of the driving member 16, previously described. The hub 18 of this driving member is in turn supported in a bearing 84 secured in a diaphragm member 86 bolted to the crankcase 10 as indicated at 88. The layshafts 64 are supported in bearings 90 and 92 formed respectively in a carrier member 94 and in the diaphragm 86. The bearings 90 are supported from the carrier members 94 by suitable forwardly extending arms 93. The relative diameters of the propeller shaft driving pinions 70 and 76 are such that the two propeller shafts 74 and 80 are driven at the same speed but in opposite directions.

Rigidly splined to the inner propeller shaft 80 is a fluid coupling driven member 96 which carries a cover 98 which in turn carries an annular internal gear 100, these parts being all secured together with the inner propeller shaft gear 78 by bolts 102 so that all parts rotate with the inner propeller shaft. Within the coupling cover 98 is a driving fluid coupling member 104 on the hub of which is formed a sun gear 106 engaged by planet pinions 108 mounted on the trunnions 24 of the driving member 16 previously described. Planet gears 108 also engage the annular gear 100, just described as rigid with the inner propeller shaft.

Figure 9:
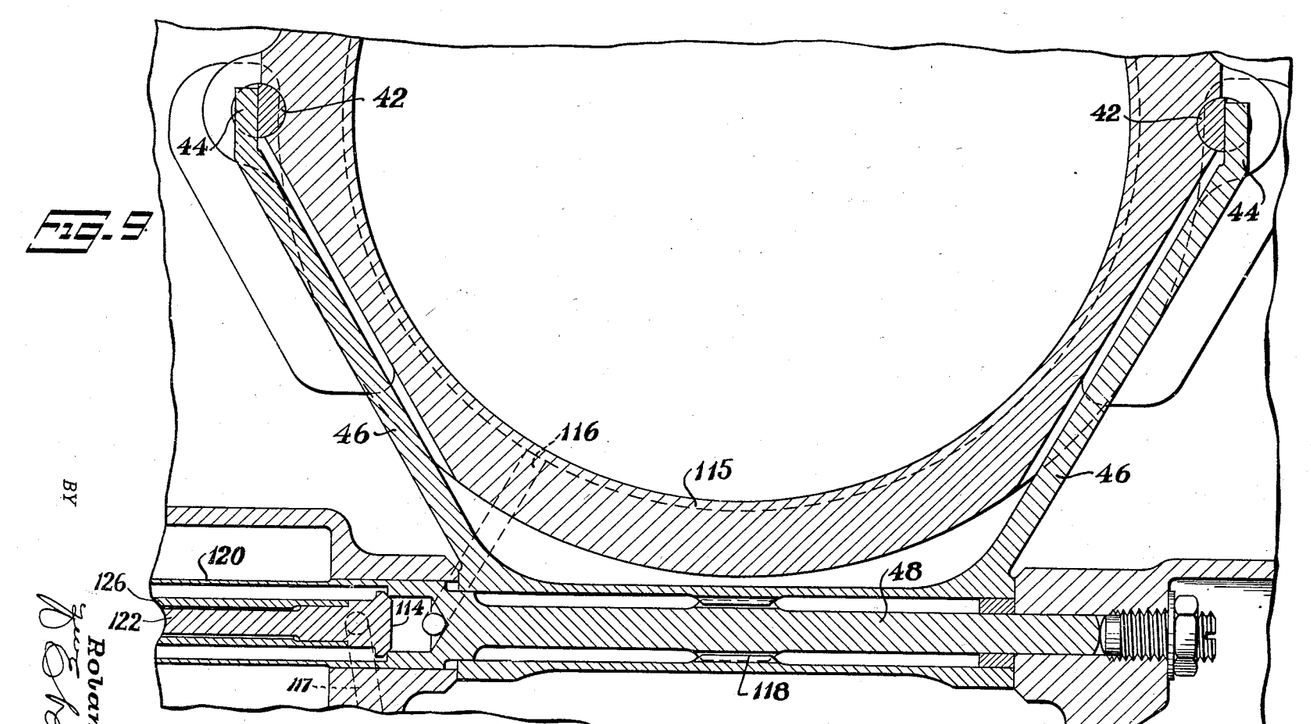
Fig. 9 is a fragmentary axial section through a shifting lever incorporating a control valve.
Figure 10:
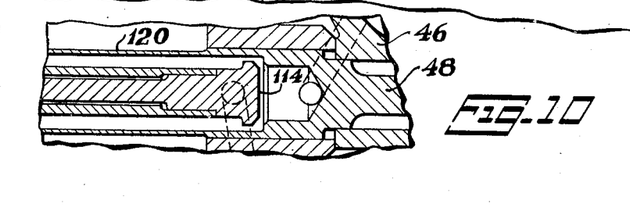
Fig. 10 is a detail view showing the valve open.
Figure 13:
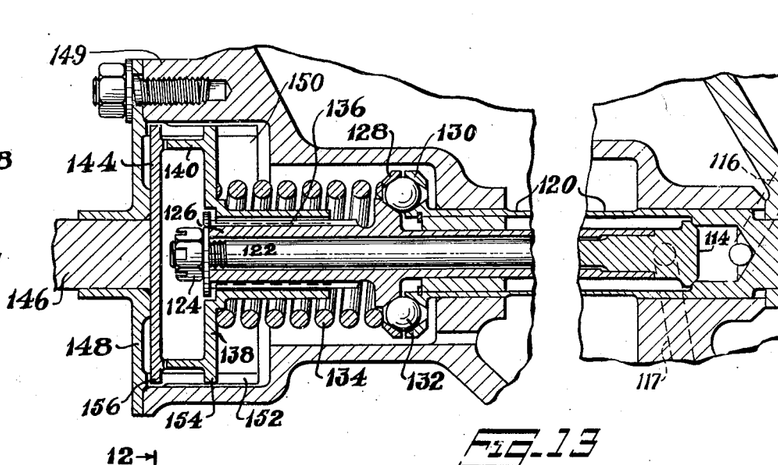
Fig. 13 is a fragmentary axial section through the mechanism of Fig. 11 and including the control valve.
Figure 14:
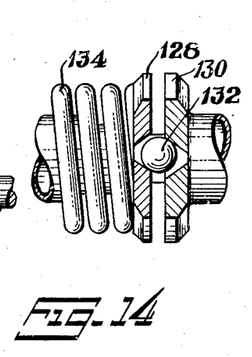
Fig. 14 is a plan view partly in section of a portion of Fig. 11.
Figure 15:
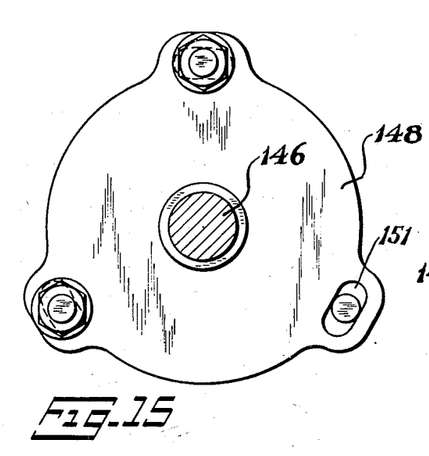
Fig. 15 is an end view of Fig. 13.

The fluid coupling 96, 104 has peripheral drain holes 110 which keep the coupling empty except when oil is supplied through passages 112 which lead from annuli 113 and 115 in the bushing 84 and diaphragm 86, respectively, and thence to a control valve 114 in the lever 46 by a suitable passage 116 (see Fig. 9). Primary 0.1 pressure is supplied to the valve 114 through passage 117 in the diaphragm 86, said passage being connected to an oil pump (not shown). The control shaft 48 is splined to the control lever 46 at 118 and has a hollow leftward extension 120 (see also Figs. 11 to 14). The valve itself has an extended stem 122 around which is secured, by a nut 124, a valve sleeve 126 having a flange 128 in which are formed circumferentially spaced conical pockets (see Fig. 13). Similar and opposed conical pockets are also formed in a companion flange 130 integral with the control shaft extension 120. Balls 132 are engaged between the pockets and a spring 134 normally keeps the valve 114 seated, the parts being adjusted so as to give a slight rotational backlash at the balls 132 when the valve is normally seated by the spring. By this mechanism the control lever shaft 48, 120, 130 may lag behind the control rotation of the operating disc 128, as shown in Fig. 14, which action carries the disc 128 to the left as shown in that figure, thereby opening the valve. In the condition shown in Fig. 14, it will be clear that the pressure of the spring 134 acting through the balls 132 and their sloping pockets is exerting a turning effort on the control shaft 48 and lever 46, thereby urging the locking member 32 to move along its parallel splines. If and when the operating conditions permit the lever 46 to respond (as will later be described), the valve 114 will be brought to the closed position. In other words, the coupling oil control valve 114 is open only while the shift lever 46 fails to respond to motion of the control, and the valve closes at the instant when this response ensues.

Figures 11, 12:
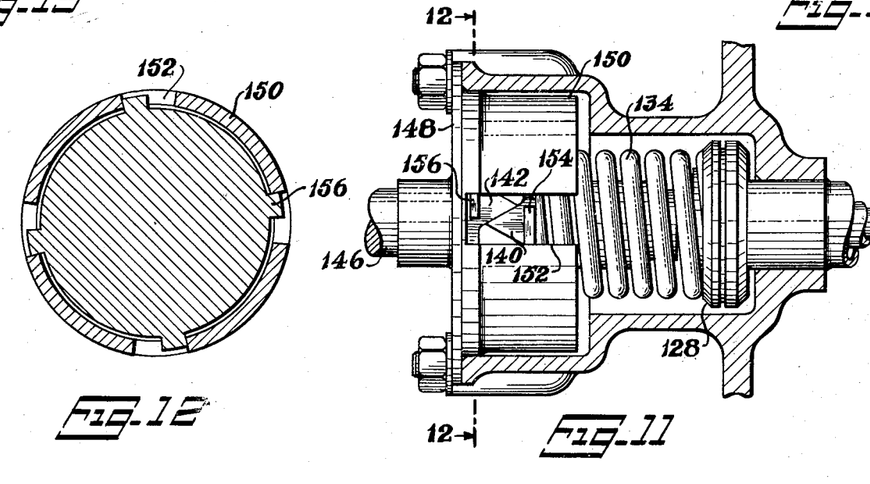
Fig. 11 is an outside view of the mechanism operating the shift lever of Fig. 9 with the housing in section.
Fig. 12 is a detail section on the line 12—12 of Fig. 11.

The control member 128 is operated through splines 136 formed on the valve extension 126 and carrying a disc 138 furnished with teeth-like cams 140 having angular faces, as shown in Fig. 11. Cooperating cams 142 are formed on a companion disc 144 integral with a primary control shaft 146 to which a suitable control lever (not shown) is applied. The number of such pairs of cams is a matter of choice. The assembly is retained in position by a cover plate 148 bolted to the housing structure 149, and elongated slots 151 permit rotational initial adjustment of this plate. The plate 148 has an inward cylindrical extension 150 provided with slots 152, and the control disc 138 is provided with lugs 154 cooperating with these slots to limit the angular control travel of the disc 138 to the desired amount. Similar but narrower lugs 156 on disc 144 permit a somewhat greater angular motion of the primary control shaft 146. In the position shown in Fig. 11 it will be seen that the driven cam 140 is below the driving cam 142 and that the axial pressure of the spring 134 is forcing the lug 154 downwards and the lug 156 upwards against respective sides of the slots 152 thereby retaining the parts in the position shown. To shift to the other position the primary control shaft 146 is rotated to move the cam 142 and lug 156 downwardly of Fig. 11 which will force the cam 140 and disc 138 to the right against the pressure of the spring 134 until the cams pass their point-to-point position. Thereupon the reaction from the spring pressure on the cams will promptly snap the disc 138 to the left forcing the cam 140 upwardly from its position illustrated in Fig. 11 and completing the downward travel of the cam 142 until both motions are arrested with the respective lugs 154, 156 again forced to the limit of their travel within the slots 152 and again holding the parts firmly in shifted position. This control movement of the cams 140 and 142 shifts the control member 128 to the position illustrated in Fig. 14 to open valve 114. Also, this particular snap-action control insures that the full control travel is realized at each shift and makes it impossible for the operator to cause the control to dwell in an intermediate position because the cams 142 and 140 are unstable in their point-to-point position. Furthermore, the turning force applied to the ball connection 128, 130, and 132, through which the lever 46 and control valve 114 are operated, is pre-determined by the strength of the spring 134 and is not subject to the vagaries of an operator.

In normal running with either gear ratio engaged, the control valve 114 is closed and the coupling 104 and 96 has emptied through its peripheral drain holes 110. Whenever the control 146 is thrown to a new position, the valve 114 is opened until the control lever 46 responds. During this period the coupling progressively fills with oil, transmitting progressively more and more torque through the planetary gears 108, ring gear 100 and the coupling 104 until the coupling has filled to the point where full engine torque is taken to the propeller system through the coupling system, thereby relieving the driving gears 54 or 56 of all torque (whichever one may have been previously engaged). At this instant, over-run is initiated between the driving member 30 and the engaged gear (54 or 56) so that the helical spline connection 28, 28a on which this driving member 30 is mounted will cause it to be screwed along the driving drum 22 into the neutral position.

Figures 6, 7, 8:
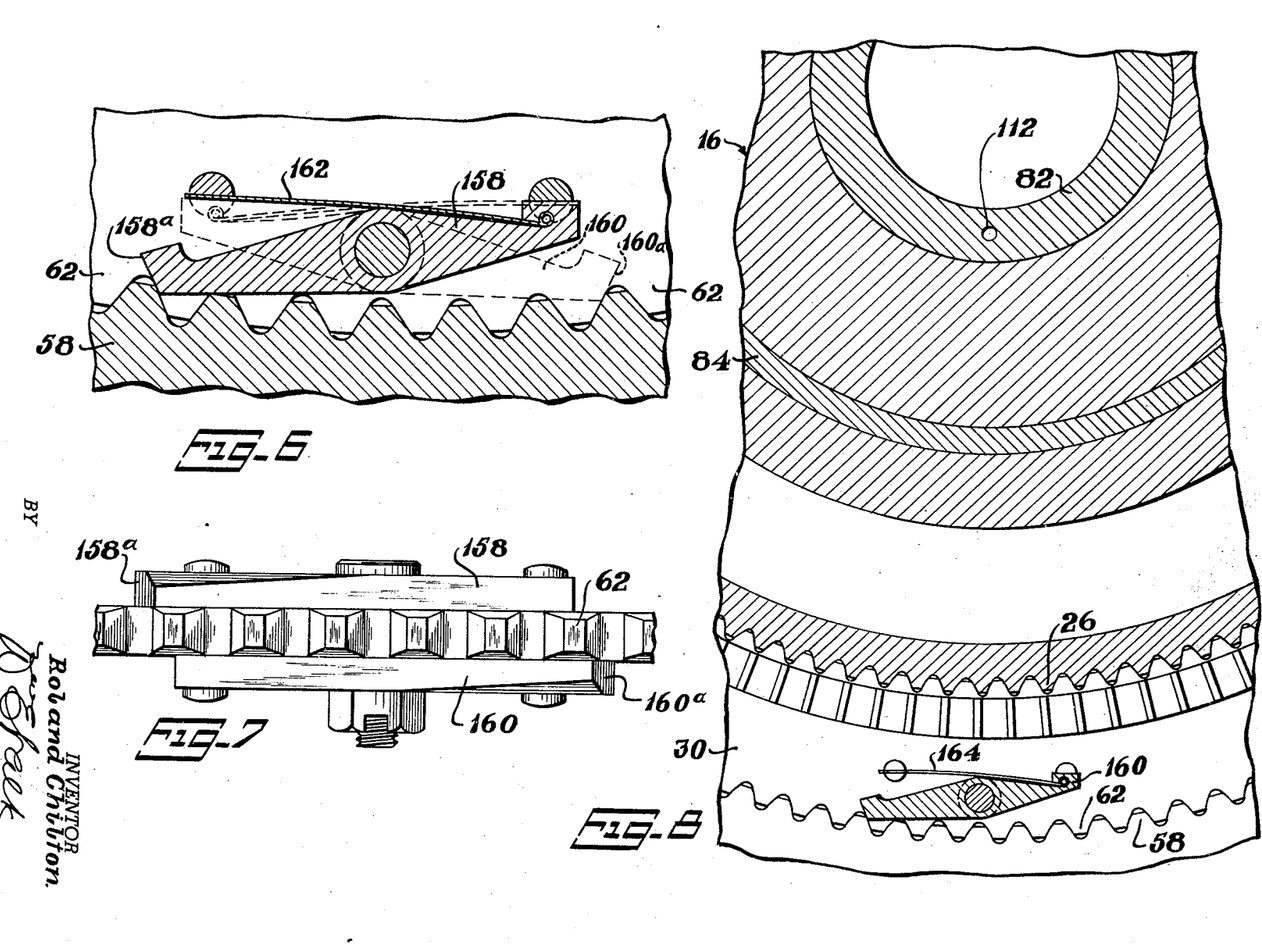
Fig. 6 is an enlarged sectional view of a shifting pawl.
Fig. 7 is a plan view of Fig. 6.
Fig. 8 is a section along the line 8—8 of Fig. 1.

The driving member 30 is equipped on each side with ratchets 158 and 160 which, in neutral position, engage the respective clutch teeth 58 and 60 of the high speed gear 54 and the low speed gear 56. It will be noted that the ratchets 158 and 160 point in opposite directions which are so correlated to the hand of the helical shifting splines that the ratchets are overrunning when the driving member 30 is at any speed intermediate to the speeds of the high speed gear 54 and the low speed gear 56. However, should the engine crankshaft be accelerated or decelerated to bring the driving member 30 through synchronism with either gear 56 or 54, the appropriate ratchet will engage thereby screwing the driving member 30 on its helical spline into engagement with the clutch teeth of the synchronized gear. It should be noted that the engaging ends 158a and 160a of the ratchets 158 and 160, respectively, are in alinement with the face of clutch teeth 62, as best seen in Figs. 6 and 7. This construction insures alinement of clutch teeth 62 and the desired clutch teeth 58 or 60 as the ratchet 158 or 160 operates to bring these teeth into mesh. In addition, spring means 162 and 164 are provided for ratchets 158 and 160 respectively, to outwardly bias the engaging ends of these ratchets.

Recapitulating this action and assuming the engine at rest with the driving member 30 in neutral position (and temporarily disregarding the locking ring 32) it would be possible to rotate the propeller system backwards and forwards through an angle of a few degrees thereby also rotating the high and low speed gears 54 and 56. Each time the propeller system was moved in the normal direction of rotation, the action of the appropriate ratchet would be to screw the driving member 30 to the left of Fig. 1 into full engagement with the clutch teeth 58 of the high speed driving gear 54, and when the propeller system was moved against the normal direction of rotation the driving member 30 would similarly be moved into engagement with the low speed gear 56.

The function of the locking member 32 is to lock the driving member 30 in these respective positions and to transmit the driving torque from the axial splines 26 of the driving drum 22 through the axial faces of the driving jaws 32a and 30a to the driving ring 30. The locking ring 32 has a further function in that its motion responds to control movement into high ratio on the completion of the resulting shift but, when the control is moved to low ratio position, the response of the locking ring anticipates the shift, occurring in fact in this case as soon as the coupling has filled sufficiently to bring the driving parts including the jaws 30a and 32a to zero torque as hereinafter described.

It should be remembered that the primary control 146 operates the shift lever 44 and locking-collar 32 through the action of the spring 134 and balls 132 thereby operating the valve 114 which opens immediately when the control is thrown to a new position but which closes only at the instant that the locking ring responds to the control movement. It is repeated that the driving forces are not transmitted from the drum 22 to the locking ring 30 through the helical splines of this member but through the parallel splines 26, the locking ring 32, and the jaws 30a and 32a. Assuming (in Fig. 2) that driving force is being applied to the drum in the direction of the arrow F and that this force is being resisted by propeller load reacting on the driving member 30 in the direction of the arrow R and assume further that the control has been thrown from "high" to "low," thereby putting light right-hand axial pressure on the locking ring 32 (from the control spring 134 acting through the balls 132 and their sloping pockets, control lever 46, control collar 40, etc., as already described). The driving load on the splines 26 and axial faces of the jaws 30a and 32a will prevent the locking ring 32 from responding to the control motion whereby the control valve 114 will be opened as soon as the control is thrown thereby starting the filling of the coupling. The splines 26 and jaws 30a and 32a are thus progressively relieved of driving load as more and more of the engine torque is absorbed through the coupling. When the coupling is transmitting the entire engine torque directly to the propeller system, the splines and jaws of the locking collar 32 are relieved of driving load so that the locking ring 32 can respond to the pressure from the control spring 134 and will be snapped smartly to the right of Fig. 2 as the balls 132 are forced from the displaced position of Fig. 14 to the normally alined position of their respective pockets. Simultaneously, this re-alignment of the balls 132 with their respective pockets will close valve 114, whereupon the coupling 96, 104 proceeds to drain. Then since the locking collar 32 has been displaced to the right, separating the driving jaws 30a and 32a, this draining of the coupling will relieve the engine of its load and permit the engine to accelerate. This acceleration instantly screws the locking ring 30 into neutral and when the engine has accelerated sufficiently to synchronize with the low speed gear 56, the driving ring 30 will be screwed fully to the right, engaging the clutch teeth 60 of the low speed gear 56 and also re-engaging the driving jaws 30a with the locking ring jaws 32a but rotated circumferentially one jaw-spacing from their previous relative engagement.

Figure 3:
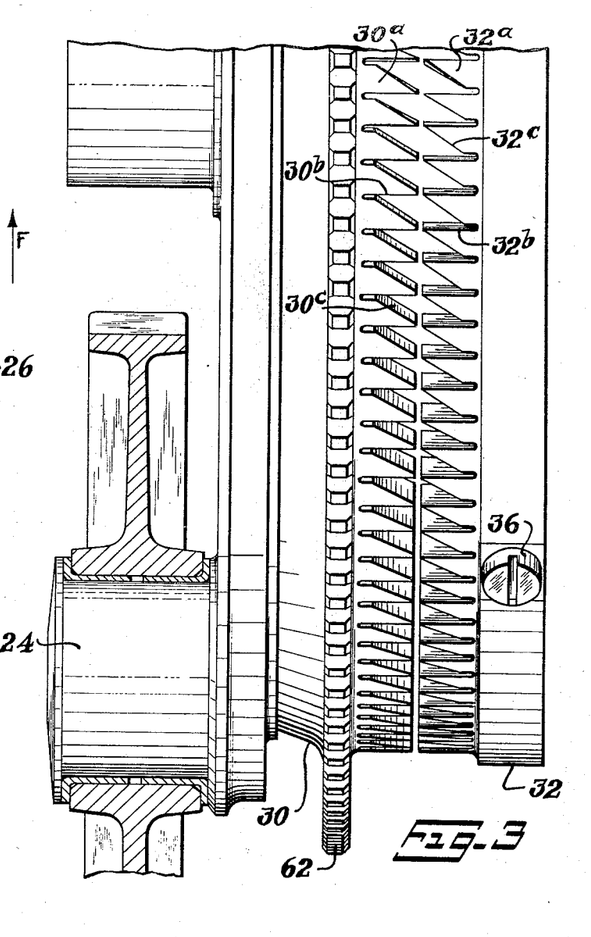
Fig. 3 is a view similar to Fig. 2 but in the unlocked position.

This action may be clearer by referring to Fig. 3 which shows the driving ring in the high speed or lefthand position with the locking ring withdrawn to the righthand end of its travel. Under this condition, it will be seen that, should the driving ring 30 be slightly rotated on its helical splines in the direction to move it to the right, the helix action will cause the driving faces 30b of the driving ring jaws 30a to contact the driving faces 32b of the locking ring jaws 32a. In other words, the parts will re-engage one jaw spacing rotationally away from their original position. As has already been said, the lead of the helical splines and of the helical backs of the locking jaws are the same. This lead is proportioned to be equal to the axial shift movement of the locking ring multiplied by the number of the locking jaws which is the condition which gives one jaw rotational advance per shift.

In the case of a shift to high ratio from low (wherein the locking ring 32 and the driving ring 30 were engaged in their righthand positions) the throwing of the control applies lefthand control spring pressure to the locking ring and opens the control valve. As the coupling fills beyond the point to relieve jaws 30a and 32a, of ring 30 and collar 32, of all engine torque, deceleration of the engine relative to the propeller is initiated and therefore the driving ring 30 will be immediately screwed along its helical spline leftwardly of Figs. 2 and 3 into neutral position and the high speed ratchet will engage and over-run the clutch teeth 58. This relative deceleration continues until the locking ring 30 synchronizes with the clutch teeth 58 of high speed gear 54. Further deceleration of the locking ring 30 is prevented by the ratchet locking with the teeth 58 so that the next increment of deceleration of the drum 22 screws the locking member 30 along its helical splines into full engagement with the clutch teeth 58. During this action the control spring pressure is urging the locking ring 32 to follow the leftward axial meshing movement of the locking ring 30 but this response is prevented because the helical lead of the backs of the jaws 30 and 32a is the same as the lead of the shifting helix so that the locking ring does not follow the driving ring until the teeth come to point-to-point position which happens as the clutch teeth 58 are fully engaged and thereupon the locking ring jaws will snap smartly to the left, thereby closing the control valve, as previously described. The coupling then proceeds to drain and, when empty, the entire driving torque again devolves on the gear system through the high speed gear and the meshing and locking rings.

Alternatively summarized, a shift to low gear requires that the engine accelerate as soon as the coupling fills sufficiently to assume the entire engine driving torque (at which instant the control spring operates to separate the driving jaws 30a and 32a) and therebeyond until synchronization with low gear occurs, whereas a shift to high requires that the engine decelerate until synchronization is reached between clutch teeth 62 and teeth 58 of high speed gear 54. That is, the coupling supply must be maintained to synchronization of clutch teeth 58 and 62 for a shift into high and must be cut off as soon as neutral is reached for a shift to low. In other words, closing of the control valve is effected by the response of the locking ring to the control movement and this response anticipates a shift into low but follows the completion of a shift into high as provided by the geometry of the locking jaws and the control valve organization.

Returning now to the fluid coupling and its drive, it will be seen that the planetary gears 108 comprise a floating gear connection between the annular gear 100 which is rigid with the propeller shaft system, as previously described, and the sun gear 106 which rigidly drives the coupling member 104. Assuming that the sun gear 106 is one-fourth of the diameter of the ring gear 100 and that this ring gear were fixed from rotation, then the planetary gearing would drive the coupling member 104 at five times the speed of the trunnions 24, i. e., of the engine crankshaft. Actually, the annular gear 100 is rotating at propeller speed, which will be considerably less than crankshaft speed, so that the actual speed of the coupling 104 is somewhat less than five times crankshaft speed, depending upon the propeller reduction gear ratio being synchronized. At this point attention is called to the fact that since no fixed reaction member is provided for the planetary gear system 100, 106 and 108, the coupling and its associated planetary gear system can never drive the propeller at a speed in excess of the crankshaft speed. In other words, as the coupling is loaded, the limiting condition is a direct drive from the crankshaft. However, with the assumed 1 to 4 ratio of the diameters of gears 106 and 100, the torque distribution in this system always is that four-fifths of the engine torque is transmitted directly to the propeller system through the annular gear 100 leaving only one-fifth of the engine torque to be absorbed by the geared-up coupling 104, thereby reducing the size of coupling required. Further, the capacity of these couplings depends upon the percentage "slip" between the driving member 104 and the driven member 96 and in this construction this slip is a very high percentage. For example, with an engine crankshaft speed of 2400 R. P. M. and a propeller speed of 800 R. P. M., the speed of the coupling driving member 104 would be 9200 R. P. M. and the slip between this coupling driving member 104 and the driven member 96 would be 8400 R. P. M. or about 91%.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In a transmission, a driving member, a driven member, change speed gears therebetween, a coupling loadable to transmit torque between said members to relieve said change speed gears of driving load, and gear means providing a step-up speed ratio drive from the driving member to said coupling and simultaneously providing a gear drive between the driving and driven members.

2. In a multi-speed transmission, a driving member, a driven member, a variable ratio gearset interposed between said members, and a normally disengaged slip coupling drive also connected between said members, said coupling drive comprising engageable driving and driven slip coupling elements, an internal gear drivably connected to the driven member, a sun gear connected to the driving element of the coupling, and one or more planet pinions interposed between said gears and drivably connected to said driving member.

3. In a multi-speed transmission, a driving member, a driven member, a variable ratio gearset interposed between said members and a normally disengaged slip coupling drive also connected between said members and concentric with said driving member, said coupling drive comprising engageable driving and driven slip coupling elements an internal gear drivably connected to the driven member, a sun gear connected to the driving element of the coupling, said gears being concentric with said coupling elements and driving member, and one or more planet pinions interposed between said gears and drivably connected to said driving member.

4. In a multi-speed transmission, a driving member, a driven member, a variable speed gearset drivably connected between said members, said gearset comprising means automatically shiftable from one gear ratio to another in response to relative acceleration and deceleration of said means and one of said members, and a normally disengaged slip coupling drive connected in parallel with said gearset between said members and controllably loadable to effect said relative acceleration and deceleration, said coupling drive comprising driving and driven coupling means, planetary gear means interposed between said driving member and said driving coupling means, and a planetary gear reaction member drivably connected to said driven member.

5. In a multi-speed transmission, a driving member, a driven member, a variable speed-reduction gearset drivably connected between said members, said gearset comprising means automatically shiftable from one gear ratio to another in response to relative acceleration and deceleration of said means and one of said members, a normally disengaged slip coupling drive connected in parallel with said gearset between said members and controllably loadable to effect said relative acceleration and deceleration, said coupling drive comprising driving and driven coupling means, means drivably connecting said driving member to both said driving and driven coupling means in response to loading of said coupling and in such a manner that the driving coupling means is driven at a speed substantially greater than that of the driving member and so that only a portion of the coupling drive load is transmitted through the driving coupling means.

6. In a multi-speed transmission, a driving member, a driven member, a variable speed reduction gearset drivably connected between said members, said gearset comprising means carried by one of said members and shiftable from one gear ratio to another in response to speed synchronization therewith, a normally disengaged slip coupling drive connected in parallel with said gearset between said members and controllably loadable to effect said synchronization, said coupling drive comprising loadable driving and driven coupling elements and gear means so arranged that upon loading of said elements only a portion of the load assumed by the coupling drive is transmitted through said driving element, said gear means providing a gear drive for the balance of said load.

7. In a multi-speed transmission, a driving member, a driven member, a variable speed gearset drivably connected between said members, said gearset being automatically shiftable from one gear ratio to another in response to relief of driving torque and to speed synchronization therewith, a normally disengaged slip coupling drive connected in parallel with said gearset between said members and controllably loadable to assume the driving torque and effect said speed synchronization, said coupling drive comprising loadable driving and driven slip coupling elements and gear means so arranged that upon loading of said elements only a portion of the load assumed by the coupling drive is transmitted through said driving element.

8. In a multi-speed transmission, a driving member, a driven member, a variable ratio gearset interposed between said members, and a normally unloaded slip coupling loadable to provide a drive between said members in parallel with said gearset, said coupling drive comprising loadable driving and driven slip coupling elements and gear means so arranged that upon loading of said coupling only a portion of the torque transmitted by said gear means is transmitted through the driving element of said coupling.

9. In a multi-speed transmission, a driving member, a driven member, a variable ratio gearset interposed between said members, and a normally unloaded slip coupling loadable to provide a drive between said members in parallel with said gearset, said coupling drive comprising driving and driven coupling elements, a first gear connected to one of said members, a second gear connected to the driving element of the coupling, and one or more planet pinions meshed with said gears and drivably connected to the other of said members.

10. A power transmission having a driving and a driven shaft, speed ratio shift means operative to drivably associate said shafts at any one of a plurality of speed ratios, and a normally unloaded slip coupling loadable to provide a drive between said shafts to relieve said speed ratio shift means of driving torque to initiate a speed ratio shift, said slip coupling drive comprising loadable driving and driven coupling elements and gear means arranged to transmit only a portion of said relieving torque through said driving element.

11. A power transmission having a driving and a driven shaft, speed ratio shift means operative to drivably associate said shafts at any one of a plurality of speed ratios, and a normally unloaded slip coupling loadable to provide a drive between said shafts to relieve said speed ratio shift means of driving torque to initiate a speed ratio shift, said coupling drive comprising driving and driven slip coupling elements and planetary gear means so arranged that when said coupling elements are loaded said planetary gear means drives said driving coupling element at a speed higher than that of either of said shafts and said planetary gear means provides a gear drive between said shafts in parallel with said coupling elements.

12. A power transmission having a driving and a driven shaft, speed ratio shift means operative to drivably associate said shafts at any one of a plurality of speed ratios, and a normally unloaded slip coupling loadable to provide a drive between said shafts to relieve said speed ratio shift means of driving torque to initiate a speed ratio shift, said slip coupling drive comprising loadable driving and driven coupling elements, a first gear drivably connected to the driven shaft, a second gear drivably connected to the driving element of the coupling, and one or more planet pinions meshed with said gears and drivably connected to said driving shaft.

13. In combination, a driving shaft, a driven shaft, a multispeed transmission affording a plurality of speed ratios between said shafts, means to automatically effect a shift into any one of said speed ratios in response to enforcement of said ratio, and a normally unloaded coupling loadable to provide a drive between said shafts in lieu of said multi-speed transmission to effect said speed ratio enforcement, said coupling drive comprising loadable driving and driven coupling members, a first gear drivably connected to said driven shaft, a second gear connected to the driving member of the coupling, and one or more planet pinions meshed with said gears and drivably connected to said driving shaft.

14. In a transmission, a driving shaft, a driven shaft, a plurality of gears, a shift member having a set of clutch teeth engageable with any one of said gears to provide a plurality of speed ratios between said driving and driven shafts, means to automatically effect engagement of said shift member with any one of said gears upon synchronization therewith, and a normally unloaded slip coupling comprising driving and driven slip coupling members loadable to reduce their slip to effect said synchronization by providing a drive between said shafts, said coupling drive comprising a first gear drivably connected to one of said shafts, a second gear drivably connected to the driving member of the coupling, and one or more planet pinions meshed with said gears and drivably connected to the other of said shafts.

ROLAND CHILTON.